Oct. 23, 1962  W. BRADLEY, JR  3,060,333
HIGH CAPACITY ACCELEROMETER
Filed March 23, 1959

INVENTOR.
WILSON BRADLEY, JR.
BY
ATTORNEY.

United States Patent Office 3,060,333
Patented Oct. 23, 1962

3,060,333
HIGH CAPACITY ACCELEROMETER
Wilson Bradley, Jr., Pasadena, Calif., assignor to Endevco Corporation, Pasadena, Calif., a corporation of California
Filed Mar. 23, 1959, Ser. No. 801,331
16 Claims. (Cl. 310—8.4)

This invention relates to improvements in accelerometers, and particularly to an improved accelerometer employing piezo-electric material for generating electrical signals in accordance with the acceleration being detected.

In an accelerometer of the type to which this invention applies, a piezo-electric sensing element is mounted in a case or other suitable housing with one face in contact with the housing and the other face in contact with an inertial member or mass which is pressed against the piezo-electric element by means of a spring. An electric circuit is connected to the piezo-electric element for detecting, indicating or recording electrical signals generated by the piezo-electric element in response to acceleration of the case when it is mounted upon a vibrating object.

In order to make it possible to detect accelerations of very low frequencies, it is desirable to employ a piezo-electric element which has a high electrical capacity. With the piezo-electric accelerometers heretofore employed, such low frequency response has generally been obtained in one of two ways. In one way the electrical circuit to which the piezo-electric element is connected has been provided with a high input resistance, namely, a resistance of the order of 100 to 1,000 megohms. In such a case the reciprocal of the time constant of the circuit so formed determines the low frequency cut-off of the system. The use of an electrical circuit having such a high input resistance has many disadvantages. Among these disadvantages is the fact that the input resistance is subject to change due to the deposit of dust on the parts at the input of the amplifier, due to the effects of corrosion when the equipment is used under many adverse ambient conditions such as in a salt-air atmosphere, or such as in an atmosphere of high humidity, as in the tropics, or during storms. When the input resistance of the amplifier drops because of such effects, the low cut-off frequency of the system is raised, thereby rendering it ineffective for faithfully reproducing low frequency components of the acceleration being detected.

In another way of providing a low cut-off frequency, an additional capacitance is connected in shunt with the input resistance of the amplifier. While the addition of such an input capacitance increases the time constant at the input of the amplifier, thereby reducing the low cut-off frequency to a lower value, and thereby making it possible to employ an input resistance far below 100 to 1,000 megohms, the introduction of such shunting capacitance reduces the amplitude of the voltage signal impressed upon the amplifier.

The charge generated across a piezo-electric element in the form of a single crystal is proportional to the piezo-electric coefficient here referred to simply as $d$. This is the coefficient generally identified as $d_{33}$. This is the piezo-electric coefficient for compression forces, that is, forces applied across the faces of the crystal at which the charges are generated. The voltage generated by the piezo-electric element depends not only upon the charge developed across it, but also on the electrical capacitance across the faces of the crystals. For a crystal of any specific size and shape the voltage varies inversely proportional to the dielectric constant of the material.

In order to provide a high capacitance and still a high signal strength at the output of such an accelerometer, a number of synthetic ceramic polycrystalline piezo-electric materials have been developed. These materials include barium titanite, lead metaniobate and cadmium niobate, sodium niobate, a mixture of lead titanite and lead zirconate, and many others. Such materials have much higher dielectric constants than quartz, and they also have higher compressive piezo-electric coefficients.

In order to increase the output of the piezo-electric element, it is formed of a stack of crystals of a predetermined thickness that are alternately polarized an parallel-connected. Increasing the number of crystals in the stack increases the charge developed for a given compressive force applied across the stack in direct proportion to the number of crystals.

In the manufacture of ceramic piezo-electric crystals for use in accelerometers, various techniques have been developed for polarizing the crystalline material by subjecting them to a strong electric field in order to develop the piezo-electric properties of the material. Prior to the application of such an electric field, the polycrystalline piezo-electric material is isotropic and possesses a zero piezo-electric coefficient $d$, but after being subjected to an electric field above the transition temperature of the material the crystal possesses a piezo-electric coefficient along an axis very nearly parallel to the direction of the applied polarizing field. In one way of manufacturing such piezo-electric crystal discs, the discs are cut to the desired shape and then arranged in a stack through which the electric polarizing field is then aplied. In another way, the crystals are polarized individually. In either event, it is found that the axis along which the resultant polarized crystals manifest the piezo-electric property is not usually perpendicular to the faces of the disc, but deviates from the normal to the faces by varying amounts. As a result, it is found that when such a piezo-electric disc is employed in an accelerometer, the accelerometer is responsive not only to components of acceleration normal to the faces of the disc, but to a small extent to acceleration in a direction parallel to the faces of the disc. When a single crystal is employed as the sensitive element of an accelerometer the ratio of sensitivity in the transverse direction to the sensitivity along the axis may be as much as ten percent and even more. This ratio is often called cross-axis sensitivity.

According to this invention, a plurality of such crystals is employed and the crystals are randomly oriented during stacking to reduce cross-axis sensitivity. When this is done, it is found that the average cross-axis sensitivity of the stack decreases as the number of crystals in the stack is increased. After such an accelerometer has been assembled, it is tested to determine the cross-axis sensitivity. Those accelerometers which have too high a cross-axis sensitivity are rejected. However, it is also found that the number of crystals in the stack of a given height cannot be increased indefinitely. It is found that when the thickness of the crystal is reduced, a larger and larger number of crystals become fractured during assembly. Inasmuch as accelerometers of the type mentioned retail for a price in the range of hundreds of dollars, and inasmuch as the assembly cost constitutes a substantial fraction of the cost to manufacture, it will be appreciated that it is very important to minimize the rejections due to excessive cross-axis sensitivity and due to fracturing of the crystals.

I have found that the cost of manufacture of piezo-electric accelerometers employing ceramic piezo-electric materials for the piezo-electric element can be made a minimum and the height of the crystal stack can be made a minimum consistent with a low rejection rate by use of at least seven crystals of a thickness between about 0.005″ and about 0.020″, and in particular that such crystals having a thickness of about 0.010" are very effective for this purpose. The minimum height can then be made less than about 0.150". For a stack of such minimum height, if crystals of greater thickness are employed, a larger number of accelerometers must be rejected because of undesirable cross-axis sensitivity, while if the thickness of the individual crystals is decreased, a larger proportion of accelerometers must be rejected because of fracturing of the individual discs that occurs during assembly of the accelerometers. On the other hand, if the number of crystals remains fixed, an increase in crystal thickness causes an unnecessary and undesirable increase in height.

The foregoing and other advantages of my invention will be understood from the following description of a specific embodiment of this invention taken in connection with the accompanying drawings, wherein.

Figure 1:
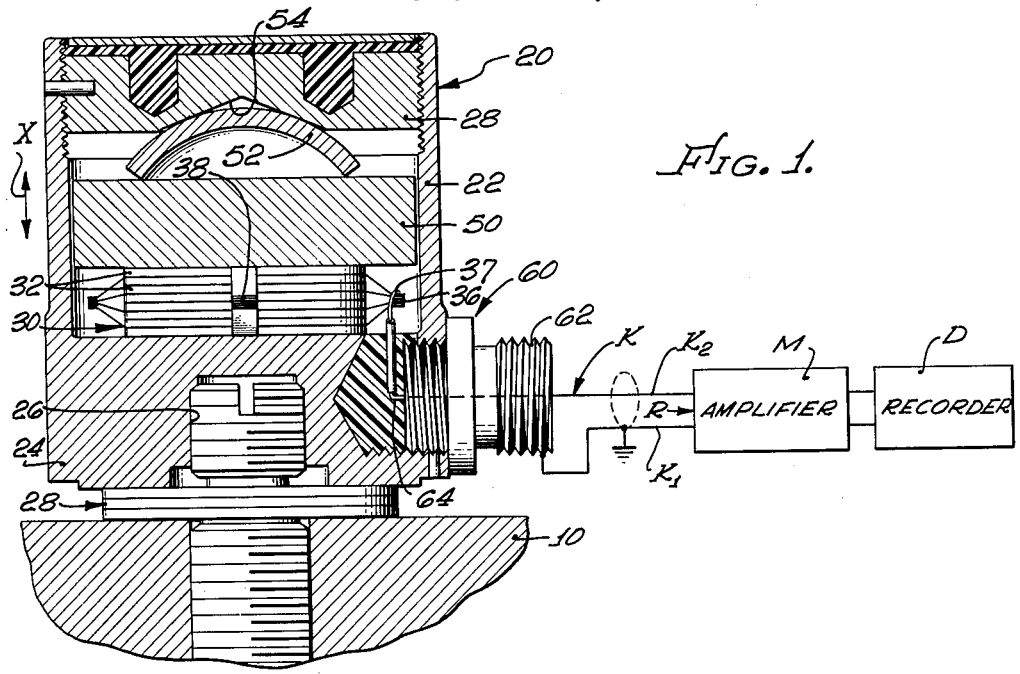
FIGURE 1 is a diagram, partly schematic and partly showing a cross-sectional view of an accelerometer.

Referring to the drawings, and particularly to FIG. 1, there is illustrated a system for measuring the acceleration of an object 10 by means of an accelerometer 20 embodying features of this invention. The measurement of such acceleration is accomplished in this embodiment of the invention by applying the electrical output of the accelerometer through a cable K to the input of an amplifier M and impressing the amplified signal to a recorder D. In such a system, the acceleration of the object 10 varies as a function of time as the object vibrates, and the recorder D records the acceleration as a function of time. The manner in which the acceleration of the object 10 was vibrated is then determined by examination of the record so produced.

Figure 3:
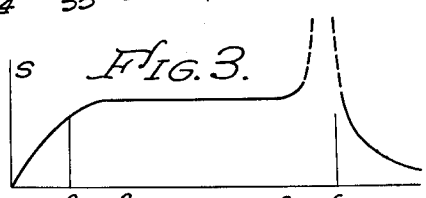

A graph of over-all sensitivity of such a system as a function of frequency is illustrated in FIG. 3. The response of such a system varies with the frequency $f$, being substantially uniform over a wide range above a low cut-off frequency $f_1$ up to a high frequency limit that is somewhat below the resonant frequency of the accelerometer. The high cut-off frequency depends upon the resonant frequency of the accelerometer and the damping. The low cut-off frequency $f_1$ depends in part upon the input resistance R of the amplifier M, the capacitance $C_1$ of the cable that connects the accelerometer to the amplifier and the capacitance C of the accelerometer.

The accelerometer 20 of this invention comprises a hollow cylindrical case or housing 22 having a thick base 24 provided with a central threaded bore 26 to permit the accelerometer to be firmly attached to the object 10 by means of a threaded connector 28 which is fixed on the object 10. The case 22 is provided with threads at its upper end to receive a threaded plug 29 which seals the upper end and which supports the internal parts of the accelerometer in place. The accelerometer is provided with a coaxial cable connector 60 which includes a threaded fastener 62 and a central terminal 64 which are respectively connected to the sheath $K_1$ and to the central conductor $K_2$ of the coaxial cable K.

The accelerometer 20 includes a piezo-electric element 30 supported in compression between the base 24 and an inertial member or mass 50. The piezo-electric element 30 is in the form of a stack of circular piezo-electric crystals, or discs 32, of the same size coaxially mounted. The inertial member 50 is of circular or cylindrical configuration and is provided with flat surfaces at the top and bottom. The inertial member 50 is likewise circular but has a larger diameter than the piezo-electric element 30. The force for holding the piezo-electric element 30 under compression is provided by a cup-shaped spring 52 that is located between the plug 28 and the inertial member 50.

The cup-shaped spring 22 is inverted, and its convex surface nests within a conical recess 54 in the lower surface of the plug 29.

Figure 2:
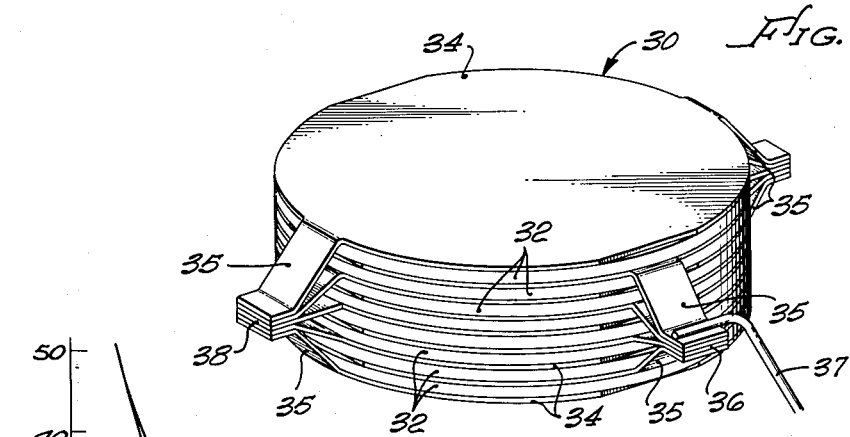
FIG. 2 is an isometric drawing of a stack of crystals employed in this invention.

As indicated in both FIG. 1 and FIG. 2, the piezo-electric element comprises a plurality of alternately polarized flat circular piezo-electric crystal discs 32. In the specific embodiment of the invention illustrated, eight crystal discs are employed. Metallic disc-shaped electrode elements 34 are mounted between successive discs and in firm contact with the surfaces of the crystal discs. In the embodiment of the invention illustrated, nine such electrode elements are employed. One set of alternate electrode elements provide one output terminal 36, while the other set of alternate electrode elements provide the other input terminal 38. To facilitate assembly of the stack of crystals prior to mounting in the accelerometer, and to provide electrical connections, each of the circular electrode elements 34 is provided with a pair of diametrically opposite tabs 35. The tabs of one alternate set of electrode elements are welded together and the tabs of the other alternate set of electrode elements are welded together, thus securing the stack of crystal discs together as a unitary sub-assembly. The two sets of welded tabs provide the two electric terminals for the piezo-electric element. One set of electrode elements is in direct electrical communication with the base 24, hence with the threaded fitting 62 of the cable connector 60. The other electrode 36 is connected to the central conductor 64 of the cable connector 60. The two sets of alternate electrode elements 34 are thus electrically connected in parallel. With this arrangement, when the compressive force applied to opposite faces of the crystal element 30 is varied, a variable voltage appears across the two electrical terminals 36 and 38 of the piezo-electric element.

For most economical results the faces of the crystals are finished smooth to an optical polish, the electrode elements are composed of sheets of silver plated brass and the inner surface of the base is finished on a lathe with a cutter commonly available in a machine shop, and the lower surface of the inertia member is lapped to a smooth finish.

In the assembly of the accelerometer, the stack of crystals is placed on the base 24, the inertia member is placed on top of the stack of crystals, and then the spring 52 is placed on the inertia member, and the plug 28 is screwed into place. The inner electrode 36 is connected by means of a flexible lead 37 to the central conductor 64 of the cable connector 60.

To render the device effective as an accelerometer, the cylindrical wall of the case 22 is made stiff compared with the spring 52. With this arrangement, when the object 10 accelerates in a vertical direction parallel to the accelerometer axis normal to the faces of the crystals, as indicated by the line X, the force with which the stack of crystals is compressed is alternately increased and decreased in proportion to the magnitude of the acceleration. As a result, an alternating electric potential which varies as a function of time in the same manner that the acceleration varies as a function of time, is generated between the electrode terminals 36 and 38, and this voltage is applied to the amplifier M through the coaxial cable K, thus applying a signal to the recorder D, which thereby produces a record that displays how the acceleration varies as a function of time. In practice, of course, the acceleration is accurately reproduced only in the band of frequencies that lies between the low and high cut-off frequencies $f_1$ and $f_h$, and the signal is distorted outside that range.

It can be shown that the electrical capacitance of the piezo-electric element is given by the following formula $$C = \frac{kn^2 A}{4\pi h} = \frac{knA}{4\pi t} \qquad (1)$$

where:

$k$ = dielectric constant
$A$ = cross-sectional area of a single crystal,
$t$ = the thickness of a single crystal,
$h$ = total height of crystal stack, and
$n$ = the number of crystals.

It can also be shown that the electrical voltage generated by the piezo-electric element is $$V = \frac{ndF}{C} \qquad (2)$$

where:

$d$ = piezo-electric compressive coupling coefficient ($d_{33}$), and
$F$ = total force applied to each end of the stack of crystals.

It will be understood by those skilled in the art that the total force applied to the crystals is proportional to the mass $m$ of the inertia member and the acceleration $a$ of the case in accordance with the well known formula $$F = ma \qquad (3)$$

By combining Equations 1 and 2, it follows that $$V = \frac{4\pi dhF}{knA} \qquad (4)$$

Furthermore, it can be shown that the lower cut-off frequency is given by the formula $$f_1 = \frac{1}{2\pi RC} \qquad (5)$$

where
$R$ = effective input resistance of amplifier M.

From the foregoing equations, it is apparent that as the number of crystals in a stack of a given height is increased, the cut-off frequency is lowered in proportion to the square of the number of crystals. It is also apparent that the output voltage varies inversely as the number of crystals.

According to this invention, a large number of crystals is employed. It is therefore clear that to lower the cut-off frequency to as low a value as possible, it is desirable to increase the number of crystals in a stack of a given height as much as possible. However, I have discovered that it is undesirable to increase the number of crystals in a stack of given height indefinitely, because eventually the crystals become so thin that they break during assembly.

More particularly, when the sub-assembly unit shown in FIG. 1 is placed in the case during assembly, it is found that the crystals are liable to fracture. In fact, for some reason not fully understood, it is observed in practice that the crystals at the ends of the stack are more likely to fracture than the others. Thus, during assembly, some of the crystals may be broken to bits, rendering the accelerometer useless for its purpose in a way that is noticeable immediately. In other cases, however, the fractures may go unnoticed so that the difficulties caused by a fracture may not become apparent until after the accelerometer has been sold to a customer and used by him for a considerable period of time. In practice it is found that as the number of crystals in a stack of predetermined height is increased, the number of accelerometers that are injured and are either rejected during test or later because they are found to be unsuitable for this reason after they are sold to a customer increases.

As mentioned above, ceramic piezo-electric crystals of the type employed in accelerometers have electric axes which normally deviate from the normal to the faces of the crystal to some extent, the amount of deviation being more or less uncontrollable and usually undetermined. Such deviation of the electric axis from the normal to the faces of the crystals results in cross-axis sensitivity. By stacking the crystals in a random manner during assembly, the average amount of cross-axis sensitivity obtained decreases as the number of crystals increases.

The random orienting and the reduction of the average cross-axis sensitivity is aided by employing crystals of circular or other cross-section capable of being stacked in a very large number of directions with their external edges aligned. The use of crystals of circular cross-section is also advantageous for many other reasons, including ease of manufacture, minimum frangibility, and uniformity of dimensions.

Figure 4:
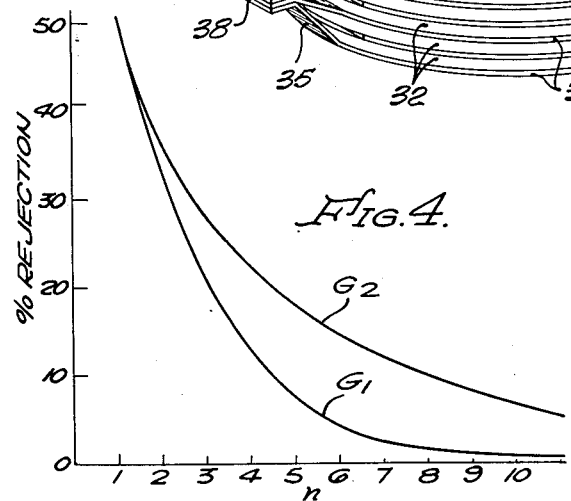
FIGS. 3 and 4 are graphs employed in explaining the invention.

In order to comply with certain military and commercial specifications, it is important that the cross-axis sensitivity be smaller than a predetermined amount of, say, 5%. Experience has shown that the number of accelerometers that have cross-axis sensitivities lower than the amount considered acceptable decreases greatly as the number of crystals is increased. In FIG. 4, graphs are shown that illustrate how the percentage of the accelerometers rejected because of excessive cross-axis sensitivity varies as a function of the number of crystals in a stack. In this particular case, the individual crystals had cross-axis sensitivities that averaged about 5%. When such crystals are randomly stacked, the average cross-axis sensitivity of the stack so formed is less than the average cross-axis sensitivity of the individual crystals. This reduction in cross-axis sensitivity occurs because of the fact that the cross-axis sensitivities of the individual crystals may point in different directions, and the cross-axis sensitivity of the stack is the vector sum of the cross-axis sensitivities of the individual crystals. Graph G1 illustrates the theoretical relationship that would exist if the only factor affecting the cross-axis sensitivity of the stack was the number of crystals that are randomly oriented. Graph G2 represents how the rejection rate due to excessive cross-axis sensitivity actually varies with the number of crystals.

As indicated by both graphs G1 and G2, the use of at least eight such crystals in a stack results in a great reduction in the rejection rate, and hence a great saving in the cost of assembly. However, graphs G1 and G2 also indicate that little is to be gained by increasing the number of crsytals in the stack much above about nine.

Another factor that appears to affect the rejection rate besides the random orientation of the axes of cross-axis sensitivity involves the fact that an increase in the number of crystals results in an increase in the number of slippage planes between the crystals and thus results in a reduction of the shearing forces to which crystals are subjected during assembly.

Cross-axis sensitivity is also affected by the ratio of stack height to stack diameter.

To maintain the height of the crystal stack at a minimum value consistent with a low rejection rate and hence low manufacturing cost, about eight crystals are employed that have a thickness of about 0.010″. Low rejection rate and high economy with minimum crystal height can be achieved by employing crystals having a thickness between about 0.005″ and 0.020″. In any event, the sheets of electrode material are made as thin as practical, the sheets between adjacent crystals having a thickness of about 0.001″, and the sheets at the ends of a stack having a thickness of about .003″. The thickness of these individual sheets, it is to be noted, is considerably less than the thickness of the individual crystals. In such a case the stack height can be made less than about 0.150″. In one instance, it was found that by using eight crystals instead of two, the number of rejections from this cause could be reduced from 50% to 10%. The use of at least seven but no more than nine such crystals in the stack results in a great saving in cost of assembly and minimum stack height. At the same time, the stack diameter is made greater than the stack height. In practice, to minimize cross-axis sensitivity the crystal diameters are made a large portion of the diameter of the case consistent with the need for space for electrode terminals and the like.

In connection with this invention, it is important to realize that in practice an accelerometer is made as small as conveniently possible in order to maintain its weight low and in order to make it possible to install it in a small space, and for other reasons. For these reasons, piezo-electric accelerometers are often made with a total height of less than one inch. Such accelerometers are often employed at the input of voltage amplifiers as described above. It can be shown that, where the total height in which the inertial mass and the crystals stack may be mounted is predetermined, irrespective of the other characteristics of the piezo-electric material, and irrespective of the density of the mass, the height of the crystals should be equal to one-third of the total height available to both the inertia mass and the crystals. Where a charge amplifier is to be employed, however, this ratio is one-half. Accordingly, for maximum output, regardless of whether it is the charge or the voltage that is being amplified, the height of the crystal stack should be about equal to the height of the inertial member. In some cases, however, it will be appreciated, the height of the inertial member is determined by the high cut-off frequency $f_h$. In this connection it will be understood that the high cut-off frequency is a function of the mass of the inertial member and the compliance of the spring by means of which the inertial member is held in place in the case. It will also be understood, of course, that the amount of force exerted by the spring when the accelerometer is initially assembled determines the average compression force applied to the piezo-electric eelments, and that the amount of force required for this purpose depends in part upon the magnitude of the maximum acceleration that is to be detected. Thus, even though a certain ratio of piezo-electric height to inertial member height may be desired to maximize the output, the ratio actually employed may be determined by other factors.

It has been found that irrespective of the height of the crystal element within the range of heights encountered in practical accelerometers, the percentage of rejection of accelerometers that are satisfactory may be substantially minimized by utilizing stacks of crystal elements that have the optimum thickness described above.

By virtue of the fact that the capacitance of an accelerometer increases as the square of the number of crystals, it is not only possible to reduce the low cut-off frequency $f_l$ when employing an amplifier having a predetermined input resistance R, but it is also possible to employ an amplifier of lower input resistance in order to attain a predetermined low cut-off frequency $f_l$. Since, as explained above, amplifiers having lower input resistances may be used under adverse atmospheric conditions, it is very desirable to employ an accelerometer embodying this invention where such adverse atmospheric conditions are likely to be encountered.

From the foregoing description, it is thus seen that I have provided an improved accelerometer of low production cost, and minimum height, which is especially adapted for use to attain low cut-off frequencies with an amplifier having a predetermined input resistance, or to use lower input resistance for a predetermined low cut-off frequency. Thus, with this invention, it is possible to measure accelerations more readily under adverse atmospheric conditions, and to measure accelerations to lower frequencies where ambient atmospheric conditions cannot be readily controlled.

Although only one particular form of the invention has been specifically disclosed and described herein, it will be obvious that the invention is not limited to that particular form of the invention, but is capable of being embodied in many forms. Various changes, which will suggest themselves to those skilled in the art after learning of the invention, may be made in the material form, details of construction and arrangement of the parts without departing from the scope of the invention as defined by the following claims.

I claim:

1. In an accelerometer that includes a housing having a base member adapted to be accelerated in accordance with the acceleration of an object under investigation, an inertia member resiliently supported in said housing, and a piezo-electric element compressibly supported between said base member and said inertia member, the improvement wherein said piezo-electric element comprises a stack of at least two alternately polarized parallel-connected ceramic piezo-electric crystal discs each of which has a thickness of between about 0.005" and 0.020".

2. An accelerometer as defined in claim 1 in which said discs are randomly assembled in said stack.

3. An accelerometer as defined in claim 2 in which said stack consists of at least seven alternately polarized parallel-connected ceramic piezo-electric crystal discs.

4. An accelerometer as defined in claim 2 in which said stack consists of eight alternately polarized parallel-connected ceramic piezo-electric crystal discs.

5. An accelerometer as defined in claim 1 wherein at least some of said crystals have cross-axis sensitivities, and in which the axes of cross-axis sensitivity are irregularly oriented in directions normal to the axis of the stack.

6. An accelerometer as in claim 1 wherein alternate crystal discs are electrically connected in parallel and the two resultant sets of the crystal discs are electrically connected in parallel.

7. An accelerometer as defined in claim 1 wherein at least some of said crystals have cross-axis sensitivities and in which the axes of cross-axis sensitivity extend in different directions normal to the axis of the stack.

8. An accelerometer as in claim 7 wherein said sheet metal electrodes are provided with tabs projecting outwardly from said discs, the tabs of each of said two alternating sets of electrodes being connected to a corresponding common conductor.

9. In an accelerometer that includes a housing having a base member adapted to be accelerated in accordance with the acceleration of an object under investigation, an inertia member resiliently supported in said housing and a piezo-electric element compressibly supported between said base member and said inertia member, the improvement wherein said piezo-electric element comprises a stack of at least two alternately polarized parallel-connected ceramic piezo-electric crystal discs having a thickness of about 0.010".

10. In an accelerometer, a housing having a base member adapted to be accelerated in accordance with the acceleration of an object under investigation, an inertia member supported in said housing and a piezo-electric element supported between said base member and said inertia member, said piezo-electric element comprising a stack of at least seven randomly oriented alternately polarized parallel-connected ceramic piezo-electric crystal discs, the total height of the stack being less than about 0.150".

11. In an accelerometer, a housing having a base member adapted to be accelerated in accordance with the acceleration of an object under investigation, an inertia member supported in said housing and a piezo-electric element supported between said base member and said inertia member, said piezo-electric element comprising a stack of at least seven alternately polarized parallel-connected ceramic randomly oriented piezo-electric crystal discs, pairs of successive crystal discs being separated by thin sheets of metal, forming electrodes, the total height of the stack being less than about 0.150".

12. In an accelerometer, a housing having a base member adapted to be accelerated in accordance with the acceleration of an object under investigation, an inertia member supported in said housing and a piezo-electric element supported between said base member and said inertia member, said piezo-electric element comprising a stack of at last seven alternately polarized parallel-connected ceramic piezo-electric crystal discs, pairs of successive crystal discs being separated by thin sheets of metal, forming electrodes, the total height of the stack being less than about 0.150", the width of the stack being greater than its height.

13. An accelerometer as defined in claim 12 in which said discs are randomly assembled in said stack.

14. An accelerometer as defined in claim 12 in which the width of the stack is a large fraction of the internal diameter of the housing.

15. An accelerometer as in claim 12 wherein alternating sheet metal electrodes are electrically connected in parallel, intermediate sheet metal electrodes being also connected in parallel electrically, the two resultant sets of electrodes being electrically connected in parallel to said base member and said inertia member respectively.

16. An accelerometer as in claim 12 wherein each of said crystal discs has a thickness less than about 0.02".

References Cited in the file of this patent
UNITED STATES PATENTS

| | | |
|---|---|---|
| 2,411,401 | Welch | Nov. 19, 1946 |
| 2,639,210 | Robertson et al. | May 19, 1953 |
| 2,714,672 | Wright et al. | Aug. 2, 1955 |
| 2,873,426 | Dranetz | Feb. 10, 1959 |